United States Patent
Lee et al.

(10) Patent No.: US 11,467,447 B2
(45) Date of Patent: Oct. 11, 2022

(54) BACKLIGHT UNIT AND DISPLAY DEVICE

(71) Applicant: LG Display Co., Ltd., Seoul (KR)

(72) Inventors: JaeHo Lee, Paju-si (KR); MyungJoon Park, Paju-si (KR); Suhun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/243,007

(22) Filed: Apr. 28, 2021

(65) Prior Publication Data

US 2021/0341788 A1 Nov. 4, 2021

(30) Foreign Application Priority Data

Apr. 29, 2020 (KR) .................. 10-2020-0052281

(51) Int. Cl.
*G02F 1/13357* (2006.01)
(52) U.S. Cl.
CPC .. *G02F 1/133605* (2013.01); *G02F 1/133608* (2013.01)
(58) Field of Classification Search
CPC .................. G02F 1/133605; G02F 1/133608
See application file for complete search history.

(56) References Cited

U.S. PATENT DOCUMENTS

| 2015/0191933 A1* | 7/2015 | Stetter | B29D 99/006 427/256 |
| 2015/0234111 A1* | 8/2015 | Lee | G02F 1/1336 362/608 |
| 2017/0153500 A1* | 6/2017 | Matsumoto | F21V 3/00 |

* cited by examiner

*Primary Examiner* — Julie A Bannan
(74) *Attorney, Agent, or Firm* — Birch, Stewart, Kolasch & Birch, LLP

(57) ABSTRACT

A backlight unit and a display device including the backlight unit are discussed. By arranging at least one electronic element for driving a light source and the backlight unit on a surface where the light source is disposed in a printed circuit and arranging a pattern having a reflective characteristic in an area where the electronic element is disposed, an image quality of the backlight unit can be maintained and a design structure of the backlight unit can be simplified. In addition, the light source and the electronic element can be disposed on a same surface of the printed circuit so that a space is not present between an opposite surface of the surface of the printed circuit where the light source is disposed and a cover bottom, so the performance of a heat dissipation can be improved in an area where the light source or the electronic element overlaps.

19 Claims, 16 Drawing Sheets

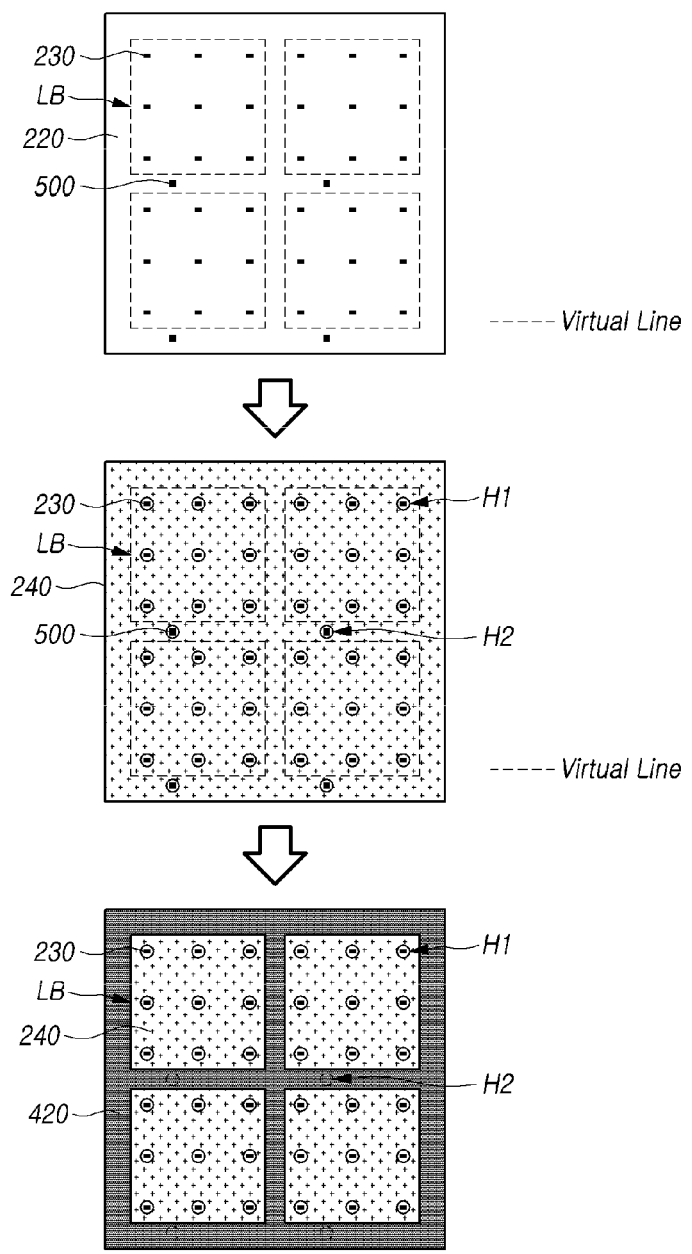

BACKLIGHT UNIT AND DISPLAY DEVICE

CROSS REFERENCE TO RELATED APPLICATION

This application claims the priority benefit of Korean Patent Application No. 10-2020-0052281, filed in the Republic of Korea on Apr. 29, 2020, the entire contents of which are hereby expressly incorporated by reference for all purposes as if fully set forth into the present application.

BACKGROUND

Field

Embodiments of the present disclosure are related to a backlight unit and a display device including the backlight unit.

Description of Related Art

The growth of the information society leads to increased demand for display devices to display images and use of various types of display devices, such as a liquid crystal display device, an organic light emitting display device, etc.

The liquid crystal display device among these display devices can comprise a display panel and a backlight unit supplying a light to the display panel. The display panel being supplied the light from the backlight unit can control the luminance of a plurality of subpixels disposed in the display panel and can display an image corresponding to an image data.

However, since the liquid display device further comprises the backlight unit in addition to the display panel, the entire thickness of the liquid display device can increase. In a case where reducing the thickness of the backlight unit is considered in order to reduce the entire thickness of the liquid display device, an image quality of the backlight unit can drop due to the lack of an enough optical gap.

Furthermore, the backlight unit can comprise various types of circuit components for driving a plurality of light sources. The circuit components can be disposed outside an area where the plurality of light sources are disposed in the backlight unit. Alternatively, in some cases, the circuit components can be disposed on an opposite surface of a surface where the plurality of light sources are disposed.

In a case that the circuit components are disposed outside the area where the plurality of light sources are disposed, however, a bezel area required in the display panel can increase.

Further, in a case that the circuit components are disposed on the opposite surface of the surface where the plurality of light sources are disposed, the thickness of the backlight unit can increase. Furthermore, a heat dissipation performance can drop by securing a space according to the disposition of the circuit components and such can cause a malfunction in the performance of driving the backlight unit.

Accordingly, improved methods/techniques are needed to minimize the thickness of the backlight unit, maintain the image quality of the backlight unit, and dispose the circuit components included in the backlight unit more efficiently.

BRIEF SUMMARY

Embodiments of the present disclosure provide methods that can reduce a thickness of a backlight unit included in a liquid crystal display device and enhance an image quality represented by the backlight unit.

Embodiments of the present disclosure provide methods that can dispose circuit components used for driving the backlight unit in the backlight unit efficiently, and methods that can improve the structure of the backlight unit which various circuit components are disposed in and that can improve the characteristics of a heat dissipation.

In an aspect, embodiments of the present disclosure can provide a backlight unit comprising a printed circuit, a plurality of light sources disposed on a surface of the printed circuit, at least one electronic element disposed on the surface of the printed circuit, and a reflector disposed on the surface of the printed circuit. The reflector comprises a plurality of first holes corresponding to each of the plurality of light sources and at least one second hole corresponding to the at least one electronic element.

The above-mentioned backlight unit can comprise a plurality of first reflective patterns positioned on at least one of the plurality of first holes and a straight distance between the first reflective pattern and the surface of the printed circuit is a first distance. Further, the above-mentioned backlight unit can comprise at least one second reflective pattern positioned on the at least one second hole and a straight distance between the second reflective pattern and the surface of the printed circuit is a second distance smaller than the first distance.

Alternatively, in the above-mentioned backlight unit, in a plane same as a top surface of the reflector, a transmittance of an area overlapping with the second hole can be smaller than a transmittance of an area overlapping with the first hole.

In another aspect, embodiments of the present disclosure can provide a display device comprising the above-mentioned backlight unit and a display panel being supplied a light from the backlight unit, which address the limitations associated with the related art.

According to various embodiments of the present disclosure, it is possible to reduce the thickness of the backlight unit and enhance the image quality of the backlight unit by arranging patterns having certain reflective characteristics on the plurality of light sources included in the backlight unit.

According to various embodiments of the present disclosure, it is possible to improve a (design) structure of the backlight unit by arranging at least one of the circuit components needed for driving the backlight unit on an area where the plurality of light sources are mounted on the printed circuit.

Furthermore, by arranging patterns having reflective characteristics on the circuit components, the circuit components can be hidden and it can be prevented to drop an optical performance due to disposing the circuit components.

Furthermore, by arranging the circuit components on the surface where the plurality of light sources are disposed, an empty space may not be present on an opposite surface of the surface where the plurality of light sources are disposed, the performance of the heat dissipation of the backlight unit can be enhanced, and the reliability of the backlight unit can be improved.

BRIEF DESCRIPTION OF DRAWINGS

The above and other objects, features, and advantages of the present disclosure will be more clearly understood from the following detailed description, taken in conjunction with the accompanying drawings, in which:

FIG. 7 is a diagram illustrating an example of a plane structure of the backlight unit illustrated in FIG. 6A or FIG. 6B;

DETAILED DESCRIPTION OF THE EMBODIMENTS

Figure 1:
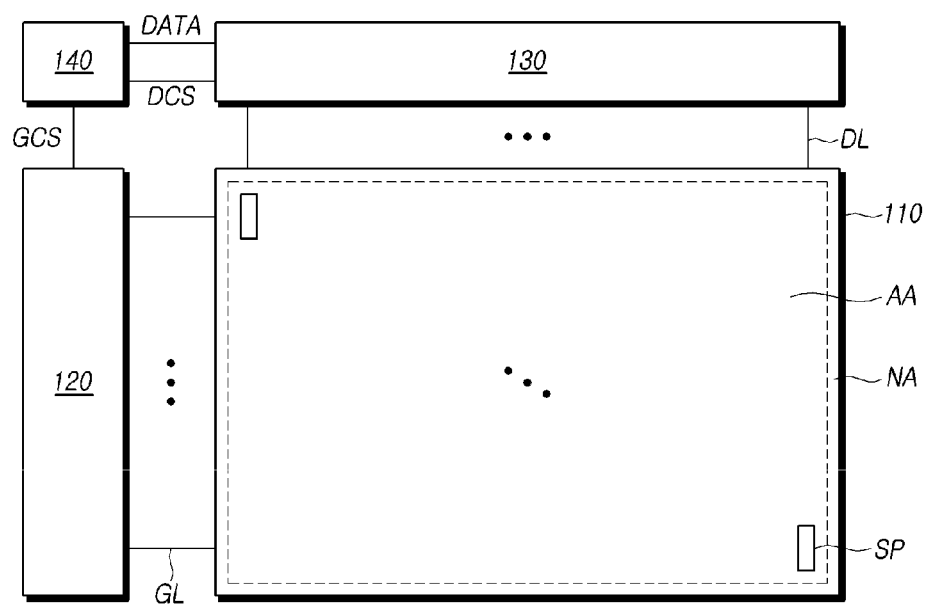
FIG. 1 is a diagram illustrating a schematic configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified.

FIG. 1 is a diagram illustrating a schematic configuration of a display device 100 according to embodiments of the present disclosure. All the components of the display device according to all embodiments of the present disclosure are operatively coupled and configured.

Referring to FIG. 1, the display device 100 according to the embodiments of the present disclosure can comprise a display panel 110 including an active area AA where a plurality of subpixels SP are disposed and a non-active area NA which is located outside the active area AA. Furthermore, the display device 100 can comprise a gate driving circuit 120, a data driving circuit 130, and a controller 140 for driving the display panel 110.

A plurality of gate lines GL and a plurality of data lines DL can be arranged on the display panel 110, and the plurality of subpixels SP can be disposed in the areas where the gate lines GL and the data lines DL intersect each other.

The gate driving circuit 120 is controlled by the controller 140, and sequentially outputs scan signals to a plurality of gate lines GL arranged on the display panel 110, thereby controlling the driving timing of a plurality of subpixels SP.

The gate driving circuit 120 can comprise one or more gate driver integrated circuits GDIC, and can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method, or can be implemented by a gate-in-panel GIP method to then be directly arranged on the display panel 110. In some cases, the gate driver integrated circuit GDIC can be integrated and arranged on the display panel 110. In addition, each gate driver integrated circuit GDIC can be implemented by a chip-on-film COF method in which an element is mounted on a film connected to the display panel 110.

The data driving circuit 130 receives image data from the controller 140 and converts the image data into an analog data voltage. Then, the data driving circuit 130 outputs the data voltage to each data line DL according to the timing at which the scan signal is applied through the gate line GL so that each of the plurality of subpixels SP emits light having brightness according to the image data.

The data driving circuit 130 can comprise one or more source driver integrated circuits SDIC.

Each source driver integrated circuit SDIC can comprise a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method, or can be directly disposed on the display panel 110. Alternatively, in some cases, the source driver integrated circuit SDIC can be integrated and arranged on the display panel 110. In addition, each source driver integrated circuit SDIC can be implemented by a chip-on-film COF method in which each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, and converts a data signal received from the outside to conform to the data signal format used in the data driving circuit 130 and then outputs the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 outputs various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 outputs various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further comprise a power management integrated circuit for supplying various voltages or currents to the display panel 110, the gate driving circuit 120, the data driving circuit 130, and the like or controlling various voltages or currents to be supplied thereto.

Each of the plurality of subpixels SP can be an area defined by the intersection of the gate line GL and the data line DL, and a liquid crystal or a light-emitting element can be disposed therein depending on the type of the display device 100.

For example, in the case that the display device 100 is preferably a liquid crystal display device, the display device 100 can comprise a light source device such as a backlight unit for emitting light to the display panel 110, and a liquid crystal can be disposed in the subpixel SP of the display panel 110. In addition, since the arrangement of the liquid crystal is adjusted by the electric field produced due to the data voltage applied to each subpixel SP, the brightness according to image data can be realized, thereby displaying images.

The backlight unit, for example, can comprise components supplying a light, and components delivering the supplied light to the display panel 110 efficiently.

Figure 2:
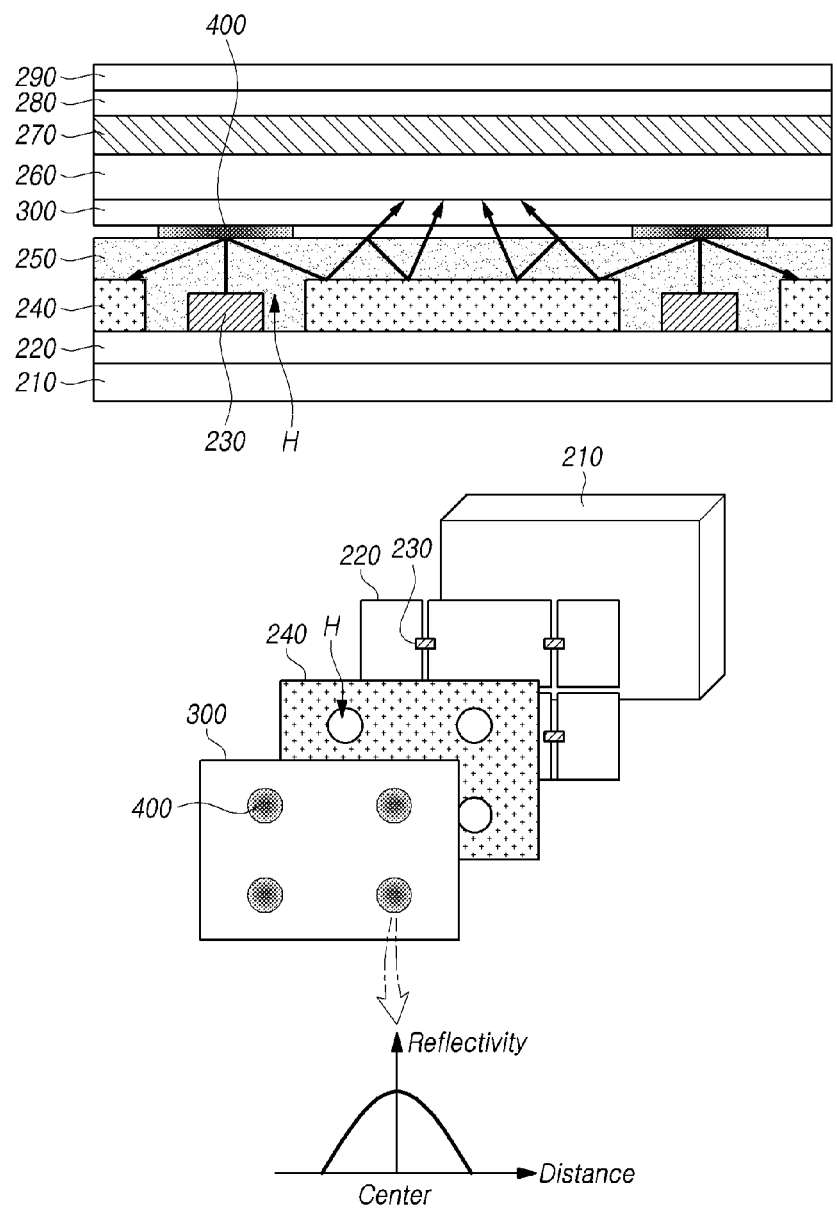
FIG. 2 is a diagram illustrating an example of a cross-sectional structure of a backlight unit according to embodiments of the present disclosure.

FIG. 2 is a diagram illustrating an example of a cross-sectional structure of a backlight unit according to embodiments of the present disclosure. This backlight unit can be used in any of the display devices discussed in the present disclosure.

Referring to FIG. 2, the backlight unit according to embodiments of the present disclosure can comprise a plurality of light sources 230 configured to emit light and various components for protecting the light source 230 or delivering the light emitted from the light source 230 to the display panel 110 efficiently. And the backlight unit can comprise a cover bottom 210 accommodating the light source 230 or the like.

The light source 230 can be disposed on a printed circuit 220. A reflector 240 can be disposed on at least a part of an area except for an area where the plurality of light source 230 is disposed on the printed circuit 220.

The reflector 240 can comprise a plurality of holes H. Each of the plurality of holes H can be positioned on an area corresponding to the light source 230. The reflector 240 can enhance a light emitting efficiency of the backlight unit by reflecting the light emitted from the light source 230 to an upper area of the backlight unit.

Here, the light source 230, for example, can be a light emitting diode. The light source 230 can be a micro light emitting diode having a size of several tens of μm. And a top surface of the reflector 240 can be located higher than a top surface of the light source 230.

A protective portion 250 can be disposed on the light source 230 and the reflector 240. The protective portion 250 can be disposed inside the hole H of the reflector 240. Furthermore, the protective portion 250 can be disposed on at least a part of the top surface of the reflector 240.

The protective portion 250 can be disposed to surround the light source 230 and protect the light source 230. Furthermore, the protective portion 250 can provide a function for guiding the light emitted from the light source 230.

The protective portion 250, for example, can be made of a silicon based resin, but not limited to this.

A reflective pattern 400 can be disposed on the protective portion 250. The reflective pattern 400 can be printed on a bottom surface of a base film 300 and positioned on the protective portion 250. Alternatively, in some cases, the reflective pattern 400 can be disposed on a top surface of the base film 300.

The reflective pattern 400 can be disposed to correspond to the light source 230. Accordingly, the reflective pattern 400 can be positioned on an area overlapping with the hole H of the reflector 240. For example, the reflective pattern 400 (i.e., the reflective area) can be positioned so that each reflective area/pattern 400 corresponds to or is positioned above one hole H of the reflector 240. And an area of the reflective pattern 400 can be determined considering a light diffusion characteristic, for example, it can be the same as an area of the hole H of the reflector 240. Alternatively, in some cases, the area of the reflective pattern 400 can be greater or smaller than the area of the hole H of the reflector 240. For instance, the size of each reflective area/pattern 400 can be greater or less than the size of the corresponding hole H of the reflector 240.

The reflective pattern 400 can reflect at least a part of the light emitted from the light source 230. For example, a part of the light emitted from the light source 230 can transmit the reflective pattern 400 and be output above the reflective pattern 400. And other part of the light emitted from the light source 230 can be reflected at the reflective pattern 400 and be output above the backlight unit by being reflected at the reflector 240.

As at least a part of the light emitted from the light source 230 is reflected by the reflector 240, a hot spot is not generated on an area where an intensity of the light by the light source 230 is the most strong and the light can be spread evenly. Accordingly, even if a thickness of the backlight unit is reduces, an image quality of the backlight unit can be enhanced by preventing a mura caused by the hot spot.

Above-mentioned base film 300, for example, can be a film made of a transparent film such as PC, PET, or the like. The reflective pattern 400, for example, can be made of $TiO_2$. Accordingly, the reflective pattern 400 can be made by printing a material having a reflective characteristic on a transparent base film 300. And the base film 300 being printed the reflective pattern 400 can be called "a light control film".

The reflective pattern 400 can have an even reflectivity entirely. Alternatively, a reflectivity of the reflective pattern 400 can be different per an area considering an amount of the light (or an intensity of the light) which is reached to the reflective pattern 400.

For example, a reflectivity of a central region of the reflective pattern 400 which an intensity of the light is the most strong can be greater than a reflectivity of an outer region of the reflective pattern 400 which an intensity of the light is weak relatively. For example, the reflectivity can decrease from the central region of the reflective pattern 400 to the outer region of the reflective pattern 400.

As disposing the reflective pattern 400 by printing materials having different reflectivity on a portion corresponding to the central region of the reflective pattern 400 and a portion corresponding to the outer region of the reflective pattern 400, the reflective pattern 400 having different reflectivity per a position can be implemented. Alternatively, as the portion corresponding to the central region of the reflective pattern 400 is made by disposing a reflective material to be thick or as several layers and the portion corresponding to the outer region of the reflective pattern 400 is made by disposing the reflective material to be thin or as a monolayer, the reflective pattern 400 can be made to have a different reflectivity per a position.

Like this, as disposing the reflective pattern 400 having a certain reflectivity on the light source 230, the light emitted from the light source 230 can be spread evenly, so a thickness of the backlight unit can be reduced and an image quality of the backlight unit can be improved.

Various optical films can be disposed on the base film 300. For example, a diffusion plate 260, a color conversion sheet 270, a prism sheet 280 and a diffusion sheet 290, or the like can be disposed on the base film 300.

Furthermore, according to embodiments of the present invention, at least one circuit component required for driving the backlight unit can be disposed on a surface same as a surface where the light source 230 is disposed. And embodiments of the present invention can provide a structure that it is prevented to drop an optical characteristic in an area where the circuit component is disposed.

Figure 3:
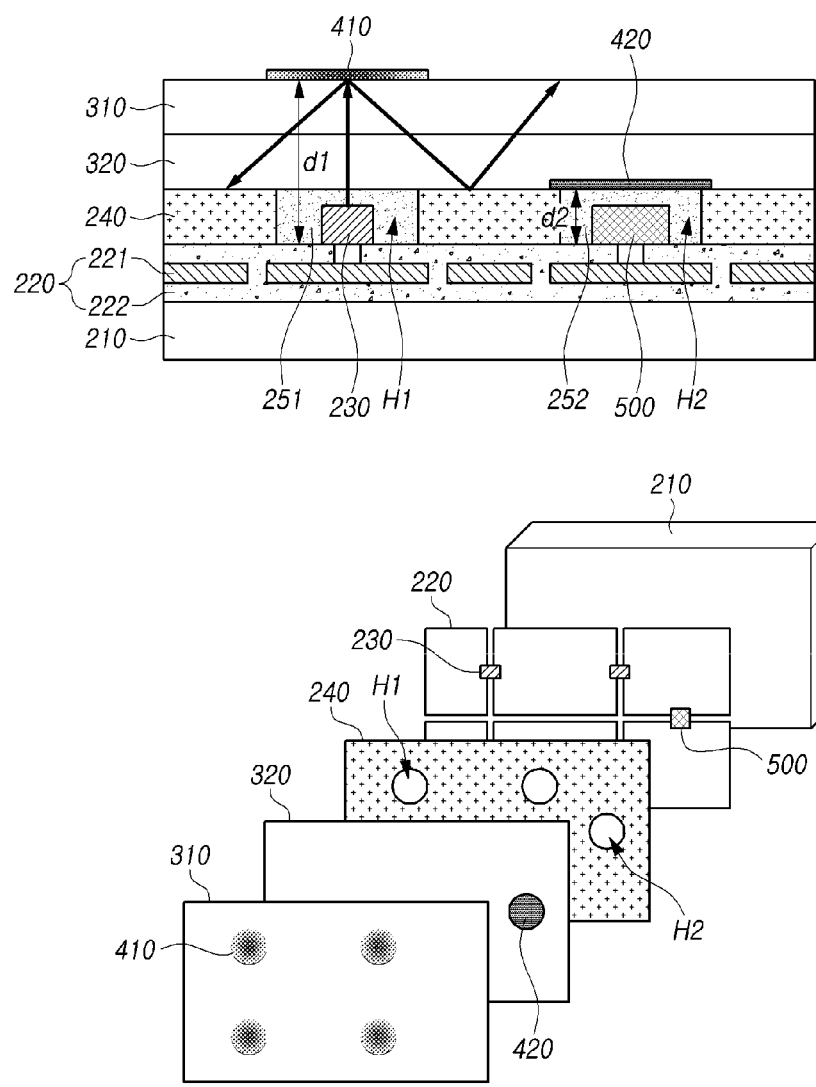
FIGS. 3, 4A and 4B are diagrams illustrating other examples of a cross-sectional structure of a backlight unit according to embodiments of the present disclosure.
Figure 4A:
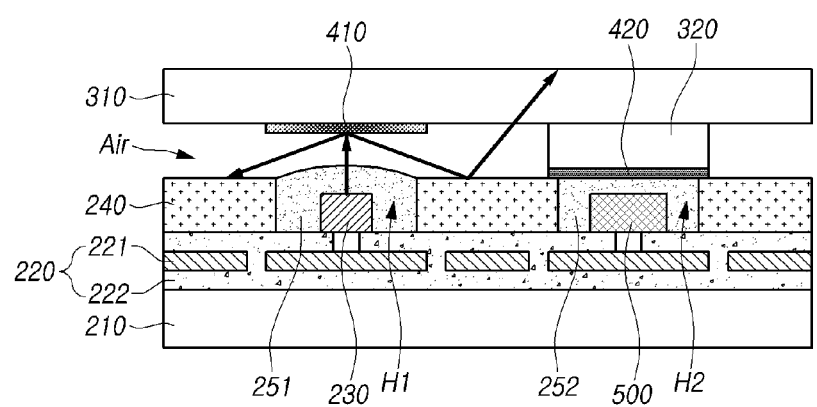
Figure 4B:
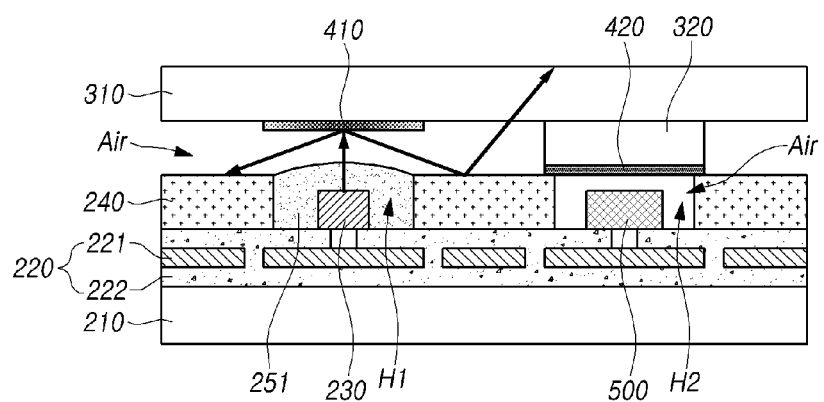

FIGS. 3, 4A and 4B are diagrams illustrating other examples of a cross-sectional structure of a backlight unit according to embodiments of the present disclosure.

Referring to FIG. 3, the printed circuit 220 can be disposed on the cover bottom 210. The printed circuit 220, for example, can comprise an insulation portion 221 and a wiring portion 222, and the wiring portion 222 can be a double layer structure.

The light source 230 can be disposed on the printed circuit 220. Furthermore, at least one kinds of electronic element 500 can be disposed on the printed circuit 220, and the electronic element 500 can be different from the light source 230.

Here, the electronic element 500, for example, can be a circuit for driving the light source 230. Alternatively, the electronic element 500 can be a circuit for controlling the circuit for driving the light source 230. Alternatively, the electronic element 500 can be an element for preventing an electrostatic discharge. For example, the electronic element 500 can be any circuit component which is necessary for the backlight unit except for the light source 230.

The light source 230 or the electronic element 500, for example, can be disposed by an ACF bonding process or a bump bonding process.

Like this, the electronic element 500 required for driving the backlight unit can be disposed on a surface where the light source 230 is mounted on the printed circuit 220. And an area where the electronic element 500 is disposed can be an area overlapping with the active area AA of the display panel 110.

Accordingly, since the electronic element 500 is disposed on the area overlapping with the active area AA of the display panel 110, the non-active area NA of the display panel 110 can be reduced.

Furthermore, as among both surfaces of the printed circuit 220, the electronic element 500 is not disposed on an opposite surface of a surface where the light source is disposed, the cover bottom 210 can contact to the printed circuit 220 directly or be connected to the printed circuit 220 by an adhesive material. Accordingly, in an area overlapping with the light source 230 or the electronic element 500, an empty space is not present between the cover bottom 210 and the printed circuit 220, and a performance of a heat dissipation of the backlight unit can be enhanced.

Furthermore, as the electronic element 500 is disposed as a similar structure of a disposition structure of the light source 230 and a pattern having a reflective characteristic is disposed on the electronic element 500, a design structure and a characteristic of a heat dissipation of the backlight unit can be improved and also it is prevented to drop an optical characteristic of the backlight unit.

For example, such as an example illustrated in FIG. 3, the reflector 240 disposed on the printed circuit 220 can comprise a first hole H1 corresponding to the light source 230 and a second hole H2 corresponding to the electronic element 500. The reflector 240 comprising the first hole H1 and the second hole H2 is disposed on the printed circuit 220 which the light source 230 and the electronic element 500 are disposed, and a structure illustrated in FIG. 3 can be made.

A first protective portion 251 can be disposed inside the first hole H1 of the reflector 240 and a second protective portion 252 can be disposed inside the second hole H2 of the reflector 240. The first protective portion 251 and the second protective portion 252 can be made of a same material, or in some cases, they can be made of different materials.

In a process that the first protective portion 251 is disposed in the first hole H1 of the reflector 240 which the light source 230 is disposed, the second protective portion 252 can be disposed in the second hole H2 of the reflector 240. Accordingly, a disposition of the electronic element 500 doesn't affect a process of manufacturing the backlight unit.

A first base film 310 can be positioned on the reflector 240 and the first base film 310 can be apart from the reflector 240. A first reflective pattern 410 can be disposed on a top surface or a bottom surface of the first base film 310.

The first reflective pattern 410 can be positioned on the light source 230. For example, the first reflective pattern 410 can be positioned on an area overlapping with the first hole H1 of the reflector 240 which the light source 230 is disposed.

A reflectivity of the first reflective pattern 410 can be the greatest in a portion corresponding to a center of the light source 230. Furthermore, the reflectivity of the first reflective pattern 410 can decrease from the center to an edge of the first reflective pattern 410.

As the first reflective pattern 410 is disposed on the light source 230, the light emitted from the light source 230 can be reflected by the first reflective pattern 410 and can be spread to each area of the backlight unit.

The first base film 310 which the first reflective pattern 410 is disposed can be considered as "a first light control film".

A second base film 320 can be positioned between the reflector 240 and the first base film 310. And a second reflective pattern 420 can be disposed on a bottom surface of the second base film 320.

The second reflective pattern 420 can be position on the electronic element 500. And the second reflective pattern 420 can be disposed on an area overlapping with the second hole H2 of the reflector 240 which the electronic element 500 is disposed, and the second reflective pattern 420 can hide the electronic element 500 disposed inside the second hole H2.

Furthermore, the second reflective pattern 420 can have a certain reflectivity for maintaining an optical characteristic of the backlight unit.

For example, the second reflective pattern 420 can have a reflectivity same with a reflectivity of a top surface of the reflector 240. Furthermore, the second reflective pattern 420 can have a reflectivity greater than a reflectivity of at least a part of the first reflective pattern 410.

The second reflective pattern 420, for example, can be made of a high reflective PSR resin, a high reflective metal thin film (e.g., Al, Ag, or the like), $TiO_2$, or the like, but not limited to these. And the second base film 320 which the second reflective pattern 420 is disposed can be made of a transparent material such as PC or PET similarly with the first base film 310.

Accordingly, as the second reflective pattern 420 having a high reflectivity is positioned on the second hole H2 of the reflector 240 which the electronic element 500 is disposed, it can be prevented to drop an optical characteristic of the backlight unit in a structure that the electronic element 500 and the light source 230 are disposed on one surface of the printed circuit 220.

The second base film 320 where the second reflective pattern 420 is disposed can be considered as "a second light control film".

The first reflective pattern 410 is disposed for the light emitted from the light source 230 to be spread evenly and the second reflective pattern 420 is disposed for the electronic element 500 to be hidden. Accordingly, a straight distance d1 between a top surface of the printed circuit 220 and the first reflective pattern 410 can be greater than a straight distance d2 between the top surface of the printed circuit 220 and the second reflective pattern 420.

Furthermore, since the first reflective pattern 410 is disposed to reflect the light emitted from the light source 230, a difference between an area of the first reflective pattern 410 and an area of the light source 230 can be great. Whereas, since the second reflective pattern 420 is disposed to hide the electronic element 500 and prevent a drop of an optical characteristic of the backlight unit, a difference between an area of the second reflective pattern 420 and an area of the electronic element 500 can be small.

For example, the difference between the area of the second reflective pattern 420 and the area of the electronic element 500 can be smaller than the difference between the area of the first reflective pattern 410 and the area of the light source 230.

Furthermore, such as above-mentioned, the first reflective pattern 410 can have different reflectivity per a region and the second reflective pattern 420 can have an even reflectivity.

Furthermore, the first reflective pattern 410 can be disposed to be apart from a top surface of the reflector 240 for maintaining a certain optical gap. Whereas, the second reflective pattern 420 can contact a part of the top surface of the reflector 240 directly or be attached by an adhesive material since the second reflective pattern 420 needs to cover the second hole H2 which the electronic element 500 is disposed.

Like this, as the second light control film comprising the second reflective pattern 420 and the first light control film comprising the first reflective pattern 410 are disposed on the reflector 240, the electronic element 500 can be disposed on a surface of the printed circuit 220 where the light source 230 is disposed and an optical performance of the backlight unit can be maintained.

Here, the second base film 320 can be disposed on the reflector 240 and the first protective portion 251 directly. Alternatively, the second base film 320 can be attached on the reflector 240 or the like by an adhesive material.

The adhesive material, in some cases, can be a material same as the first protective portion 251. For example, the first protective portion 251 can be disposed inside the first hole H1 of the reflector 240 and a top surface of the reflector 240, and the second base film 320 can be attached on the first protective portion 251.

Furthermore, in some cases, the second base film 320 can be disposed on only a part area comprising an area overlapping with the electronic element 500.

Referring to FIG. 4A, the light source 230 can be disposed in the first hole H1 of the reflector 240 and the electronic element 500 can be disposed in the second hole H2 of the reflector 240. The second reflective pattern 420 can be positioned on the electronic element 500, and the second reflective pattern 420 can be disposed as an attached type or a printed type on a bottom surface of the second base film 320.

Here, the second base film 320 can be disposed on a part of an area except for an area overlapping with an area where the light source 230 is disposed. For example, the second base film 320 can be disposed on only a part area comprising an area overlapping the second hole H2 of the reflector 240 which the electronic element 500 is disposed.

The first base film 310 can be disposed on the second base film 320, and the first reflective pattern 410 can be disposed on an area corresponding to the light source 230 on a top surface or a bottom surface of the first base film 310.

As the second base film 320 is disposed on only a part area on the reflector 240, an air layer can be present between a bottom surface of the first base film 310 and the light source 230. Accordingly, the light emitted from the light source 230 can be guided by the air layer.

Furthermore, as the second base film 320 is not disposed on the light source 230, a top surface of the first protective portion 251 disposed on the light source 230 can be a convex shape. For example, the top surface of the first protective portion 251 can be convex and a top surface of the second protective portion 252 can be flat.

As the top surface of the first protective portion 251 is convex, an output efficiency of the light emitted from the light source 230 can be enhanced.

Furthermore, as the air layer is present between the first protective portion 251 and the first base film 310, the first reflective pattern 410 can be positioned on a bottom surface of the first base film 310.

In a case that the first reflective pattern 410 is disposed on a top surface of the first base film 310, the first reflective pattern 410 can be damaged in a process for disposing an optical film or the like on the first base film 310. But it can be prevented for the first reflective pattern 410 to be damaged in the process for disposing the optical film or the like on the first base film 310, since the first reflective pattern 410 is disposed on a bottom surface of the first base film 310.

Furthermore, in some cases, an empty space can be present inside the second hole H2 of the reflector 240.

Referring to FIG. 4B, the first protective portion 251 can be disposed inside the first hole H1 of the reflector 240 where the light source 230 is disposed. And other components are not disposed inside the second hole H2 of the reflector 240 where the electronic element 500 is disposed, an air layer can be present inside the second hole H2 of the reflector 240.

As the second hole H2 of the reflector 240 is not exposed to outside since the second reflective pattern 420 is disposed on the electronic element 500, only the electronic element 500 can be disposed inside the second hole H2 of the reflector 240.

Like this, according to embodiments of the present disclosure, by disposing the first reflective pattern 410 for preventing a hot spot mura of the backlight unit and the second reflective pattern 420 for hiding the electronic element 500, an optical performance of the backlight unit can be enhanced and a structure of the backlight unit can be simplified.

Furthermore, the first reflective pattern 410 and the second reflective pattern 420 can be disposed on separate base film 300, or in some cases, they can be disposed on a same base film 300.

Figure 5:
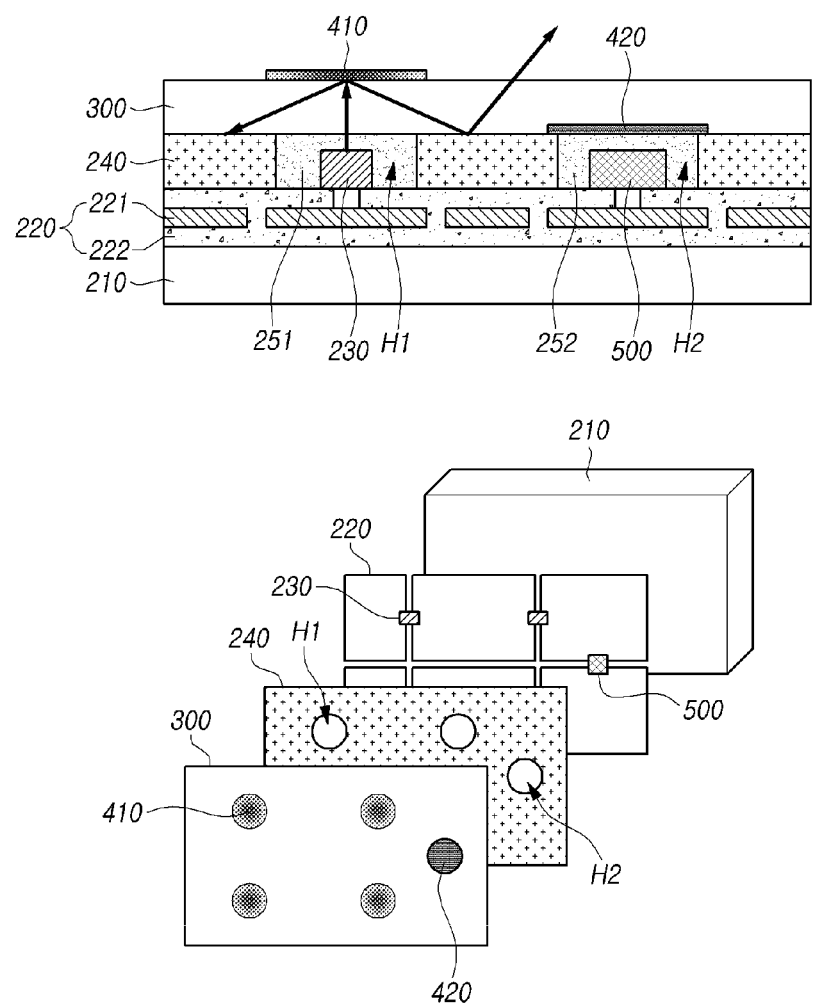
FIGS. 5, 6A and 6B are diagrams illustrating other examples of a cross-sectional structure of a backlight unit according to embodiments of the present disclosure.
Figure 6A:
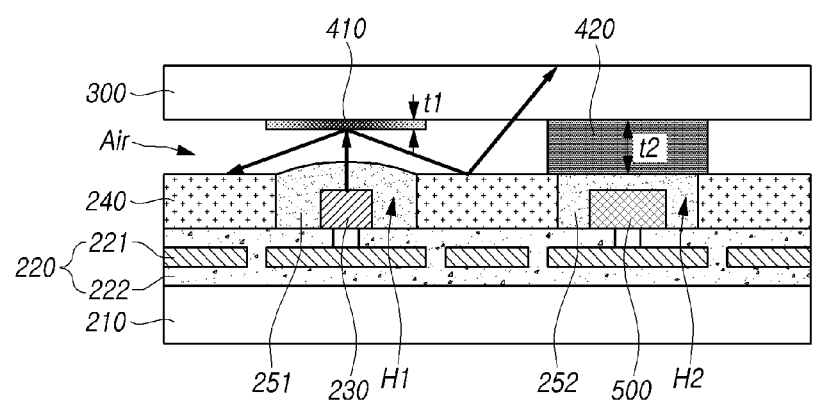
Figure 6B:
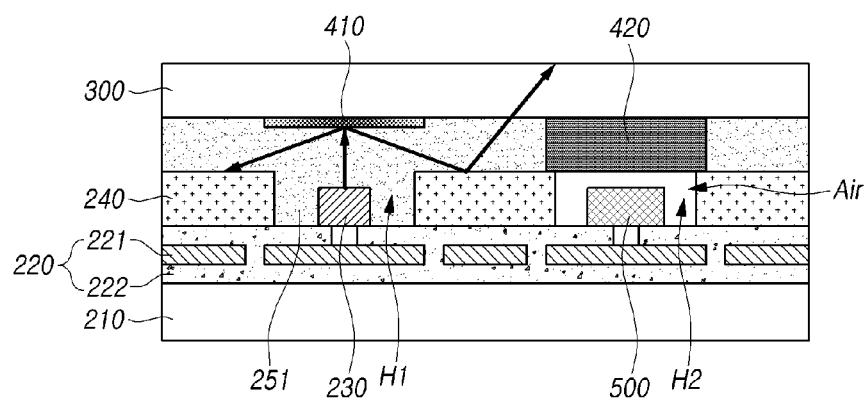

FIGS. 5, 6A and 6B are diagrams illustrating other examples of a cross-sectional structure of a backlight unit according to embodiments of the present disclosure.

Referring to FIG. 5, the plurality of light sources 230 and at least one electronic element 500 can be disposed on the printed circuit 220.

The reflector 240 can be disposed on the printed circuit 220. The reflector 240 can comprise a plurality of first holes H1 corresponding to each of the plurality of light sources 230 and at least one second hole H2 corresponding to the at least one electronic element 500.

The first protective portion 251 can be disposed in the first hole H1 of the reflector 240. The second protective portion 252 can be disposed in the second hole H2 of the reflector 240.

The base film 300 can be disposed on the reflector 240.

The first reflective pattern 410 positioned on an area corresponding to the light source 230 can be disposed on a top surface of the base film 300. Furthermore, the second reflective pattern 420 positioned on an area corresponding to the electronic element 500 can be disposed on a bottom surface of the base film 300.

As the second reflective pattern 420 is disposed on the bottom surface of the base film 300 to be adjacent to the electronic element 500, the second reflective pattern 420 can hide the electronic element 500 disposed on the printed circuit 220. Accordingly, it can be prevented that an optical abnormality due to the electronic element 500 is occurred in an area where the electronic element 500 is disposed.

As the first reflective pattern 410 is disposed on the top surface of the base film 300, the first reflective pattern 410 can be disposed to maintain a specific optical gap with the light source 230. And the first reflective pattern 410 can reflect the light emitted from the light source 230 and make the light emitted from the light source 230 to be spread evenly.

Like this, as the base film 300 which all of the first reflective pattern 410 and the second reflective pattern 420 are disposed is disposed on the reflector 240, a process can be simplified, and disposing the electronic element 500 on the printed circuit 220 and maintaining an optical performance of the backlight unit can be implemented easily.

Furthermore, in some cases, an optical gap can be made on the light source 230 by controlling a thickness of the second reflective pattern 420.

Referring to FIG. 6A, a thickness t2 of the second reflective pattern 420 positioned on the electronic element 500 can be greater than a thickness t1 of the first reflective pattern 410 positioned on the light source 230.

Accordingly, an air layer can be present between the base film 300 and the light source 230. And the first reflective pattern 410 can be disposed on a bottom surface of the base film 300.

The second reflective pattern 420 can be a structure to be attached on the bottom surface of the base film 300, or in some cases, the second reflective pattern 420 can be a structure to be disposed separately with the base film 300.

For example, after the second reflective pattern 420 is disposed on a part area on the reflector 240, the base film 300 which the first reflective pattern 410 is disposed can be disposed on the second reflective pattern 420.

For example, the second reflective pattern 420 can provide a function to support the base film 300 with a function to hide the electronic element 500.

A top surface of the first protective portion 251 disposed in the first hole H1 of the reflector 240 can be a convex shape due to a presence of an air layer under the base film 300. A top surface of the second protective portion 252 disposed in the second hole H2 of the reflector 240 can be flat shape, or in some cases, an air layer can be present inside the second hole H2 of the reflector 240.

Furthermore, a part of the first protective portion 251 can be disposed outside the first hole H1 of the reflector 240.

Referring to FIG. 6B, an air layer can be present in the second hole H2 of the reflector 240. And the first protective portion 251 disposed in the first hole H1 of the reflector 240 can be disposed on an area other than an area where the second reflective pattern 420 outside the first hole H1.

For example, after the printed circuit 200 which the light source 230 and the electronic element 500 are mounted is disposed and the reflector 240 is disposed, the second reflective pattern 420 can be disposed. In a process after the second reflective pattern 420 is disposed, the first protective portion 251 can be disposed. And the base film 300 which the first reflective pattern 410 is disposed can be disposed on the first protective portion 251 and the second reflective pattern 420. In this case, the first reflective pattern 410 can be disposed on a top surface of the base film 300.

Since the second reflective pattern 420 has a specific thickness, the backlight unit can be manufactured as various structures according to a manufacturing process.

And the second reflective pattern 420 having a specific thickness, in some cases, has a grid shape.

FIG. 7 is a diagram illustrating an example of a plane structure of the backlight unit illustrated in FIG. 6A or FIG. 6B.

Referring to FIG. 7, the light source 230 and the electronic element 500 can be disposed on the printed circuit 220. Two or more light sources 230 can be consist of one light source block LB, for example, nine light sources 230 can be consist of one light source block LB. In FIG. 7, a virtual line represents one light source block LB.

In the example illustrated in FIG. 7, the electronic element 500 can be a circuit for driving the light source 230 disposed in one light source block LB.

The reflector 240 comprising the first hole H1 and the second hole H2 can be disposed on the printed circuit 220. Accordingly, the light source 230 is disposed inside the first hole H1, and the electronic element 500 can be disposed inside the second hole H2.

The second reflective pattern 420 having a grid shape can be disposed on the reflector 240.

The second reflective pattern 420 can comprise an opening corresponding to one light source block LB. For example, the opening of the second reflective pattern 420 can overlap with an area where the light source 230 is disposed.

And various optical films such as the base film 300 comprising the first reflective pattern 410 or the like can be disposed on the second reflective pattern 420.

Accordingly, hiding of the electronic element 500 mounted on a surface of the printed circuit 220 where the light source 230 is disposed can be easy by the second reflective pattern 420, and disposition of other components included in the backlight unit can be easy.

Furthermore, as each grid of the second reflective pattern 420 corresponds to one light source block LB driven by a same circuit, it can be prevented that disposition of the second reflective pattern 420 affects an optical performance of the backlight unit.

Meanwhile, according to embodiments of the present disclosure, in some cases, the electronic element 500 mounted on one surface of the printed circuit 220 is not hidden by the second reflective pattern 420, and the electronic element 500 can be hidden by using the second protective portion 252 disposed on the electronic element 500.

Figure 8:
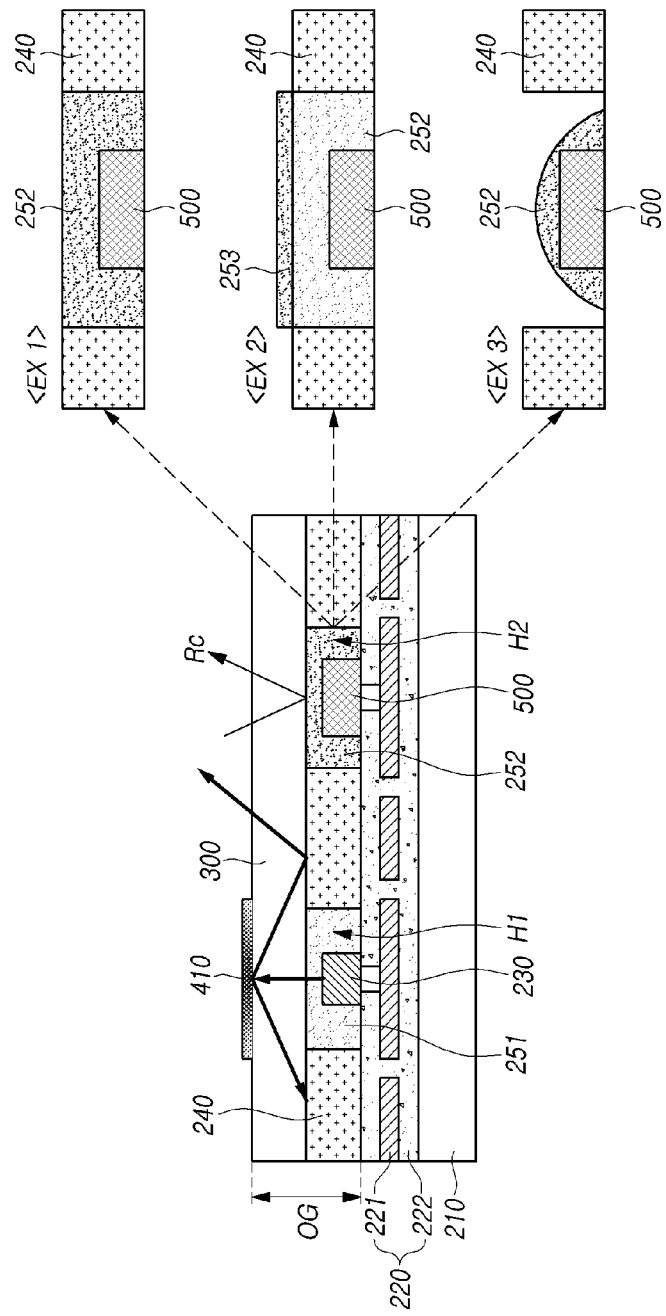
FIG. 8 is a diagram illustrating other example of a cross-sectional structure of a backlight unit according to embodiments of the present disclosure.

FIG. 8 is a diagram illustrating other example of a cross-sectional structure of a backlight unit according to embodiments of the present disclosure.

Referring to FIG. 8, the reflector 240 can be disposed on the printed circuit 220 which the light source 230 and the electronic element 500 are mounted. The reflector 240 can comprise the first hole H1 corresponding to the light source 230 and the second hole H2 corresponding to the electronic element 500.

The first protective portion 251 can be disposed in the first hole H1 of the reflector 240. And the second protective portion 252 can be disposed in the second hole H2 of the reflector 240.

The base film 300 which the first reflective pattern 410 is disposed can be disposed on the reflector 240. And a distance between a top surface of the printed circuit 220 and the first reflective pattern 410 can be considered as an optical gap OG.

Here, a transmittance of the first protective portion 251 and a transmittance of the second protective portion 252 can be different each other.

For example, the transmittance of the first protective portion 251 can be greater than the transmittance of the second protective portion 252.

Accordingly, in a plane same as a top surface of the reflector 240, a transmittance of an area overlapping with the first hole H1 can be greater than a transmittance of an area overlapping with the second hole H2. In some cases, the area overlapping with the first hole H1 can be transparent and the area overlapping with the second hole H2 can be opaque.

The first protective portion 251 can be disposed by using a material being transparent or having a high transmittance.

And the second protective portion 252, such as <EX 1>, can comprise particles of a micro size such as $TiO_2$, $SiO_2$, $Al_2O_3$, or the like which are high reflective material.

Alternatively, such as <EX 2>, a third protective portion 253 having a low transmittance can be disposed on the second protective portion 252 which has a transmittance same as a transmittance of the first protective portion 251. The third protective portion 253 can be considered as a kind of the second reflective pattern 420.

Alternatively, such as <EX 3>, the second protective portion 252 comprising a high reflective material can be disposed as a hemisphere shape surrounding the electronic element 500.

Like this, by disposing a high reflective material inside the second protective portion 252 surrounding the electronic element 500 or on the second protective portion 252, without disposing the second reflective pattern 420 separately, a reflectivity Rc in an area where the electronic element 500 is disposed can be enhanced, and the electronic element 500 can be hidden.

Figure 9A:
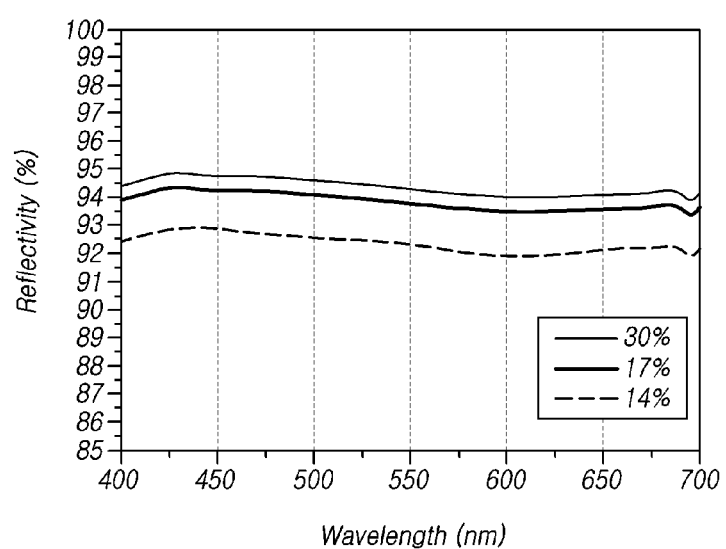
FIGS. 9A and 9B are diagrams illustrating an example of reflectivity measured according to a content or a thickness of a high reflective material in an area where an electronic element is disposed.
Figure 9B:
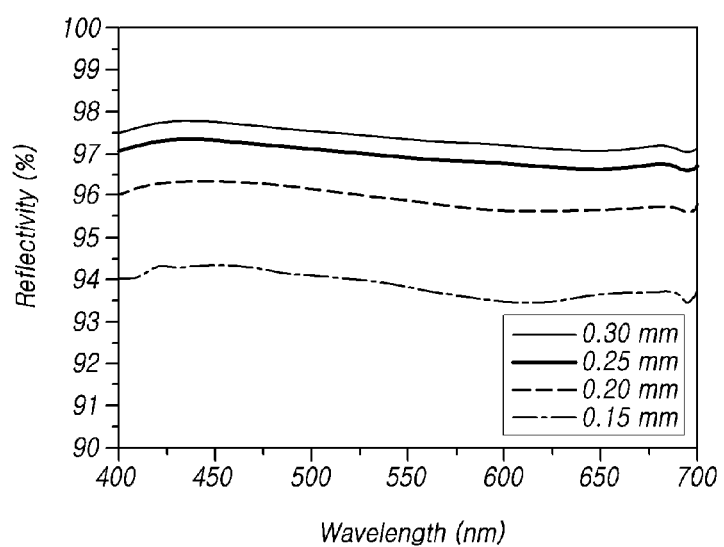

FIGS. 9A and 9B are diagrams illustrating an example of reflectivity measured according to a content or a thickness of a high reflective material in an area where the electronic element 500 is disposed.

Referring to FIG. 9A, it is represented that reflectivity measured in cases that contents of a high reflective material included in the second protective portion 252 are 14%, 17%, 30%. As illustrated in FIG. 9A, it can be known that a reflectivity approximate to 95% is represented if a content of the high reflective material is equal or greater than 17%.

Accordingly, in a structure such as <EX 1> illustrated in FIG. 8, by controlling a content ratio of a high reflective material included in the second protective portion 252, the reflectivity Rc in an area where the electronic element 500 is disposed can be configured.

Referring to FIG. 9B, it is represented that examples of reflectivity measured according to a thickness of a layer comprising a high reflective material. Such as illustrated in FIG. 9B, it can be known that, as the thickness of the layer comprising the high reflective material increases to 0.15 mm, 0.20 mm, 0.25 mm, 0.30 mm, the reflectivity increases, and the reflectivity equal or greater than 96% is represented when the thickness of the layer is equal or greater than 0.20 mm.

Accordingly, in a structure such as <EX 2> illustrated in FIG. 8, by controlling a thickness of the third protective portion 253 disposed on the second protective portion 252, the reflectivity Rc in an area where the electronic element 500 is disposed can be configured.

Here, a correlation between the reflectivity Rc in an area where the electronic element 500 is disposed and the optical gap OG for maintaining an image quality of the backlight unit can be present. Accordingly, the optical gap OG required for a specific image quality can be changed according to a configuration of the reflectivity Rc in an area where the electronic element 500 is disposed, and a thickness of the backlight unit can be changed according to the optical gap OG.

Figure 10A:
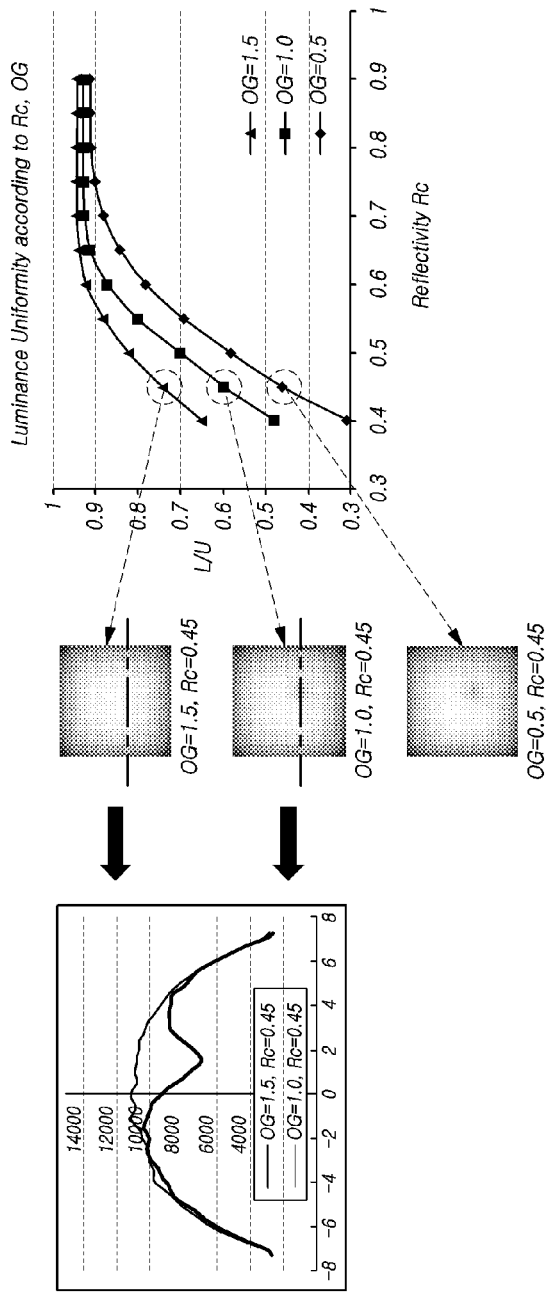
FIG. 10A is a diagram illustrating an example of a luminance uniformity of a backlight unit measured according to a reflectivity and an optical gap in an area where an electronic element is disposed.
Figure 10B:
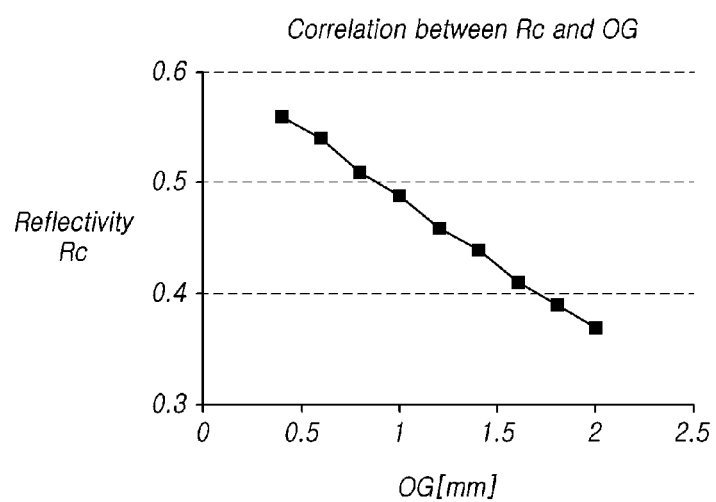
FIG. 10B is a diagram illustrating an example of an optical gap required according to a reflectivity in an area where an electronic element is disposed.

FIG. 10A is a diagram illustrating an example of a luminance uniformity of the backlight unit measured according to the reflectivity Rc and the optical gap OG in an area where the electronic element 500 is disposed. FIG. 10B is a diagram illustrating an example of the optical gap OG required according to the reflectivity Rc in an area where the electronic element 500 is disposed.

Referring to FIG. 10A, they are represented that examples of a luminance uniformity measured according to the reflectivity Rc in an area where the electronic element 500 is disposed in cases that the optical gap OG are 0.5 mm, 1.0 mm, 1.5 mm.

It can be seen that the luminance uniformity is measured high in a section that the reflectivity Rc is equal or greater than about 0.8 even if the optical gap OG is small.

In addition, it can be seen that the luminance uniformity drops if the reflectivity Rc decreases, and a degree that the luminance uniformity drops is greater as the optical gap OG is smaller.

For example, referring to the luminance uniformity measured according to the optical gap OG in the case that the reflectivity Rc is 0.45, they can be known that the luminance uniformity is equal or greater than 0.7 when the optical gap OG is 1.5 mm, but the luminance uniformity is about 0.6 when the optical gap OG is 1.0 mm, and an area where the luminance is not uniform is occurred.

Accordingly, the reflectivity Rc in an area where the electronic element 500 is disposed needs to be configured based on a size of the optical gap OG, referring to FIG. 10B, it can be known that the reflectivity Rc and the optical gap OG have a negative correlation.

For example, when reducing the optical gap OG for reducing a thickness of the backlight unit, it is necessary that the reflectivity Rc in an area where the electronic element 500 is disposed is increased. Furthermore, when configuring the reflectivity Rc small, it can be known that it is necessary that the optical gap OG is increased for maintaining an image quality.

Like this, according to embodiments of the present disclosure, by disposing the electronic element 500 and the light source 230 on a same surface of the printed circuit 220, a disposition of the electronic element 500 included in the backlight unit can be easy. Furthermore, by a structure being capable of enhancing a reflectivity of an area where the electronic element 500 is disposed, an optical performance dropping due to the disposition of the electronic element 500 can be prevented or minimized.

Here, the electronic element 500, for example, can be a circuit for driving the light source 230 or an element for an electrostatic discharge, or the like. And the electronic element 500 can be disposed on an area other than an area where the light source 230 is disposed.

Figure 11:
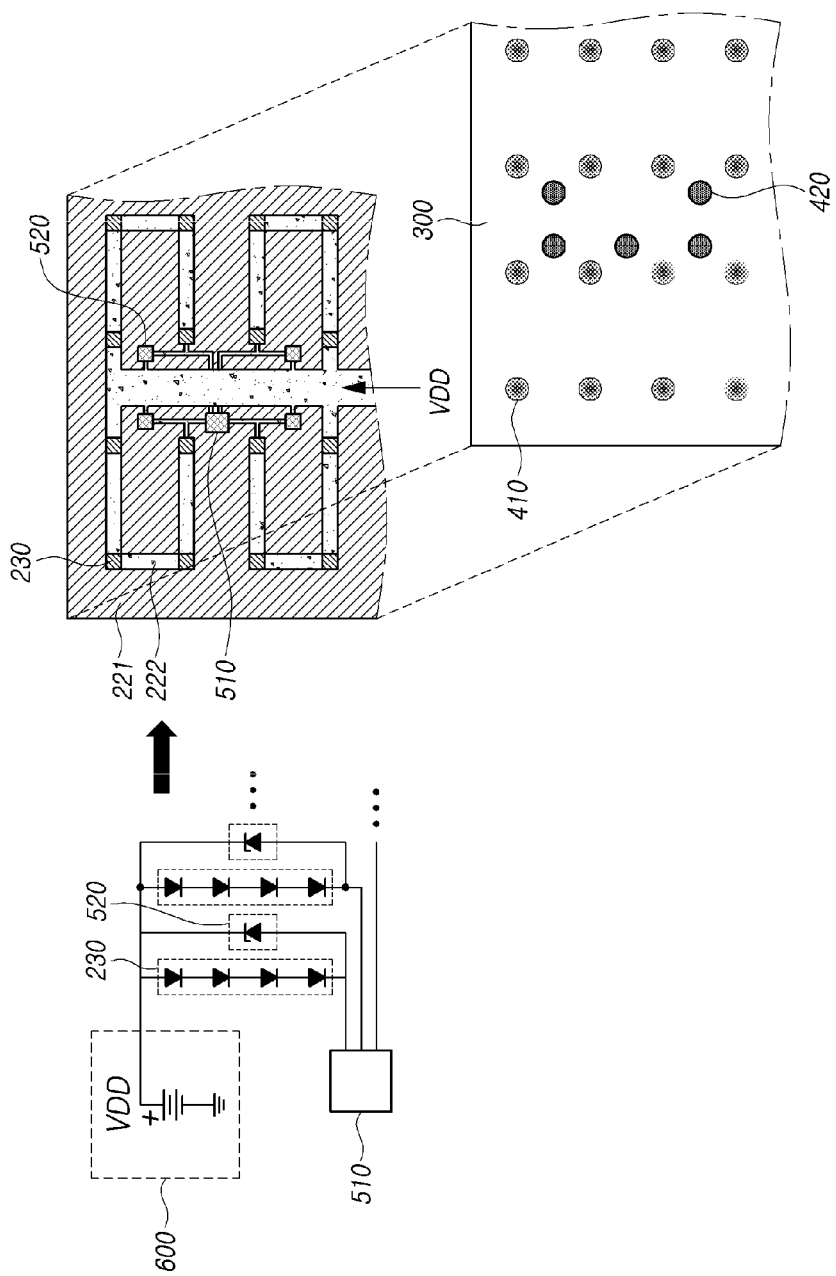
FIG. 11 is a diagram illustrating an example of a plane structure which an electronic element is disposed in an area where a light source is disposed in a printed circuit.

FIG. 11 is a diagram illustrating an example of a plane structure which the electronic element 500 is disposed in an area where the light source 230 is disposed in the printed circuit 220.

Referring to FIG. 11, the backlight unit can comprise the plurality of light sources 230 and a light source driving circuit 510 for driving the light source 230. Furthermore, the backlight unit can comprise a power supplying circuit 600 for supplying a power to the light source 230. And the backlight unit can comprise a zener diode 520 for discharging an electrostatic.

Here, the light source 230 can be disposed on the printed circuit 220, and the light source 230 can be disposed on an area overlapping with the active area AA of the display panel 110.

Further, at least one of the light source driving circuit 510, the zener diode 520, and the power supplying circuit 600 can be disposed on one surface of the printed circuit 220 where the light source 230 is disposed. Furthermore, the electronic element 500 can be positioned on an area overlapping with the active area of the display panel 110.

For example, the light source driving circuit 510 and the zener diode 520 can be disposed on one surface of the printed circuit 220 where the light source 230 is disposed.

It is necessary to make the hole H in the reflector 240 for disposing the electronic element 500 such as the light source driving circuit 510 or the like, it should not affect a distance between the light sources 230 or an optical characteristic in an area between the light sources 230. Accordingly, the electronic element 500 having a similar size with the light source 230 can be disposed on one surface of the printed circuit 220 where the light source 230 is disposed.

The light source driving circuit 510 and the zener diode 520 can be electrically connected to the light source 230 by the wiring portion 222 of the printed circuit 220.

The base film 300 which the first reflective pattern 410 and the second reflective pattern 420 are disposed can be disposed on the reflector 240.

The first reflective pattern 410 and the second reflective pattern 420, such as above-mentioned examples, can be disposed by separate films, or can be disposed by a same film. Furthermore, in some cases, a high reflective material can be contained in the second protective portion 252 surrounding the electronic element 500 and the second reflective pattern 420 may not be disposed.

Like this, by disposing the electronic element 500 in an area where the light source 230 is not disposed on one surface of the printed circuit 220, the electronic element 500 included in the backlight unit can be disposed easily.

Further, by disposing the second reflective pattern 420 or the second protective portion 252 comprising a high reflective material on an area overlapping with the electronic element 500, an image quality of the backlight unit may not be dropped due to the disposition of the electronic element 500.

Figure 12:
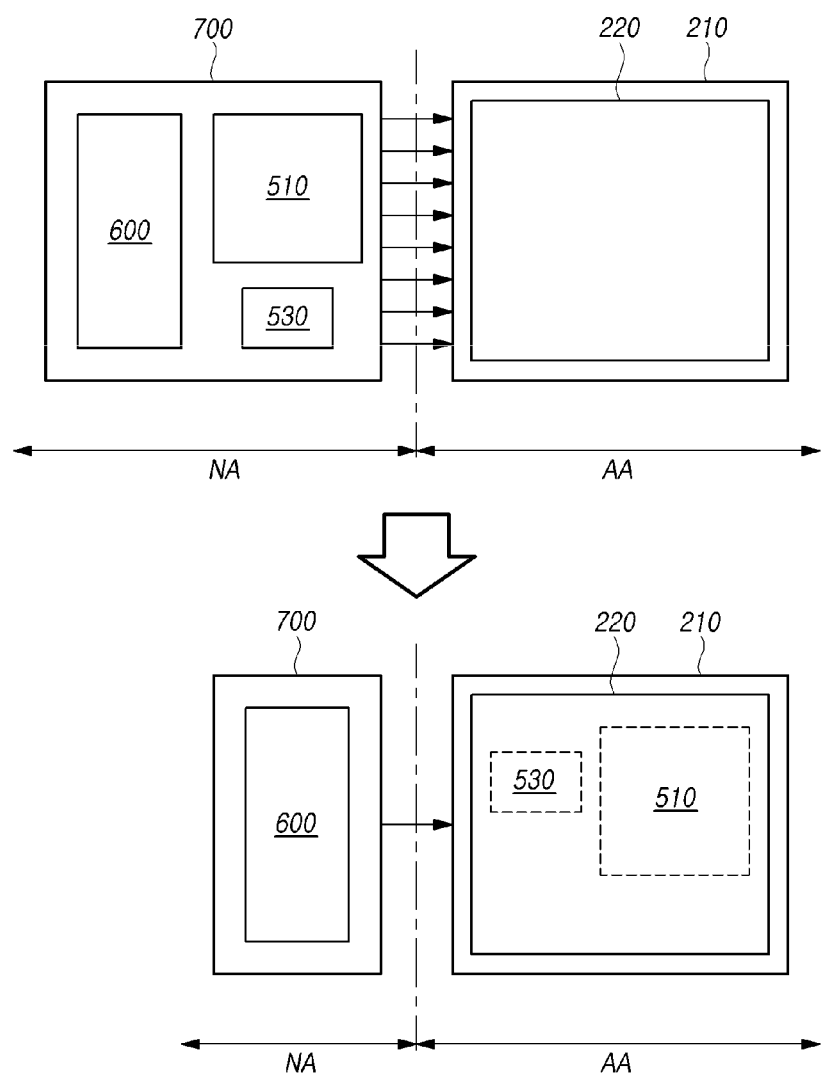
FIG. 12 is a diagram schematically illustrating an example of a changed plane structure of a backlight unit according to disposing an electronic element in an area where a light source is disposed in a printed circuit.

FIG. 12 is a diagram schematically illustrating an example of a changed plane structure of a backlight unit according to disposing the electronic element 500 in an area where the light source 230 is disposed in the printed circuit 220.

Referring to FIG. 12, the light source driving circuit 510 for driving the light source 230, and the zener diode 520 above described, as well as a light source controller 530 for controlling the light source driving circuit 510 can be disposed on one surface of the printed circuit 220 where the light source 230 is disposed. And only the power supplying circuit 600 having a big size can be positioned on a driving circuit board 700.

Such as the example illustrated in FIG. 12, by disposing the electronic element 500 such as the light source driving circuit 510 or the like in a remaining area on one surface of the printed circuit 220 where the light source 230 is disposed, the non-active area NA required in the display panel 110 can be reduced.

Further, by disposing the second reflective pattern 420 or the second protective portion 252 comprising a high reflective material on the electronic element 500 for hiding the electronic element 500 and providing a reflectivity being equal or greater than a specific level, an image quality of the backlight unit can be maintained.

Furthermore, as the light source 230 and the electronic element 500 are disposed on a same surface of the printed circuit 220, an empty space is not present between an opposite surface of the printed circuit 220 and the cover bottom 210, and a characteristic of a heat dissipation in an area overlapped with the light source 230 or the electronic element 500 can be enhanced.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device, comprising:
    a display panel; and
    a backlight unit configured to supply a light to the display panel, the backlight unit comprising,
        a printed circuit;
        a plurality of light sources disposed on a surface of the printed circuit;
        at least one electronic element disposed on the surface of the printed circuit;
        a reflector disposed on the surface of the printed circuit, and including a plurality of first holes corresponding to the plurality of light sources and at least one second hole corresponding to the at least one electronic element;
        a plurality of first reflective patterns positioned on at least one of the plurality of first holes, wherein a straight distance between one of the first reflective patterns and the surface of the printed circuit is a first distance; and
        at least one second reflective pattern positioned on the at least one second hole, wherein a straight distance between one of the at least one second reflective pattern and the surface of the printed circuit is a second distance smaller than the first distance,
    wherein a reflectivity of at least a part of one of the first reflective patterns is smaller than a reflectivity of one of the at least one second reflective pattern.

2. The display device of claim 1, wherein a reflectivity of a central region of one of the first reflective patterns is different from a reflectivity of an outer region of the one of the first reflective patterns, and
    a reflectivity of a central region of one of the at least one second reflective pattern is same as a reflectivity of an outer region of the one of the at least one second reflective pattern.

3. The display device of claim 1, wherein a difference between an area of one of the first reflective patterns and an area of the corresponding light source is greater than a difference between an area of one of the at least one second reflective pattern and an area of one of the at least one electronic element.

4. The display device of claim 1, wherein one of the first reflective patterns is spaced from a top surface of the reflector, and
    a part of one of the at least one second reflective pattern contacts to the top surface of the reflector or is connected to the top surface of the reflector by an adhesive material.

5. The display device of claim 1, wherein one of the first reflective patterns is disposed on a top surface or a bottom surface of a first base film positioned on the reflector, and
    one of the at least one second reflective pattern is disposed on a bottom surface of a second base film positioned between the reflector and the first base film.

6. The display device of claim 5, wherein the second base film is disposed on at least a part of an area except for an area overlapping with the plurality of first holes.

7. The display device of claim 6, wherein at least a part of a space between the light source and the bottom surface of the first base film is an air layer, and
    one of the first reflective patterns is disposed on the bottom surface of the first base film.

8. The display device of claim 1, wherein one of the first reflective patterns is disposed on a top surface or a bottom surface of a base film positioned on the reflector, and
    one of the at least one second reflective pattern is disposed on the bottom surface of the base film.

9. The display device of claim 8, wherein a thickness of one of the at least one second reflective pattern is greater than a thickness of one of the first reflective patterns.

10. The display device of claim 9, wherein the one of the at least one second reflective pattern comprises a plurality of openings, and
    each of the plurality of openings overlaps with an area on where two or more light sources are disposed.

11. The display device of claim 9, wherein the one of the first reflective patterns is disposed on the bottom surface of the base film, and at least a part of a space between the one of the first reflective patterns and the corresponding light source is an air layer.

12. The display device of claim 1, further comprising:
a plurality of first protective portions disposed in each of the plurality of first holes; and
at least one second protective portion disposed in the at least one second hole,
wherein one of the at least one second reflective pattern is positioned on a top surface of the at least one second protective portion.

13. The display device of claim 12, wherein a top surface of one of the first protective portions is convex, and the top surface of the at least one second protective portion is flat.

14. The display device of claim 12, wherein a transmittance of one of the first protective portions is greater than a transmittance of the at least one second protective portion.

15. The display device of claim 1, wherein an air layer is between one of the at least one second reflective pattern and one of the at least one electronic element.

16. The display device of claim 1, further comprising:
a cover bottom configured to accommodate the printed circuit,
wherein the cover bottom contacts other surface of the printed circuit or is connected to the other surface of the printed circuit by an adhesive material on an area overlapping with at least one of the light source and the at least one electronic element.

17. The display device of claim 1, wherein at least one of the plurality of light sources is electrically connected to the at least one electronic element.

18. A backlight unit, comprising:
a printed circuit;
a plurality of light sources disposed on a surface of the printed circuit;
at least one electronic element disposed on the surface of the printed circuit;
a reflector disposed on the surface of the printed circuit, and including a plurality of first holes corresponding to the plurality of light sources, and at least one second hole corresponding to the at least one electronic element;
a plurality of first reflective patterns positioned on at least one of the plurality of first holes, wherein a straight distance between one of the first reflective patterns and the surface of the printed circuit is a first distance; and
at least one second reflective pattern positioned on the at least one second hole, wherein a straight distance between one of the at least one second reflective pattern and the surface of the printed circuit is a second distance being smaller than the first distance,
wherein a reflectivity of at least a part of one of the first reflective patterns is smaller than a reflectivity of one of the at least one second reflective pattern.

19. A backlight unit, comprising:
a printed circuit;
a plurality of light sources disposed on a surface of the printed circuit;
at least one electronic element disposed on the surface of the printed circuit; and circuit
a reflector disposed on the surface of the printed circuit, and including a plurality of first holes corresponding to the plurality of light sources and at least one second hole corresponding to the at least one electronic element,
a plurality of first protective portions disposed in the plurality of first holes; and
a second protective portion disposed in the second hole, wherein a transmittance of the second protective portion is smaller than a transmittance of the plurality of first protective portions.

* * * * *